(12) United States Patent
Tian et al.

(10) Patent No.: US 12,292,108 B2
(45) Date of Patent: May 6, 2025

(54) GEARBOX ADAPTER AND GEARBOX

(71) Applicant: Siemens Aktiengesellschaft, Munich (DE)

(72) Inventors: Zhi Gang Tian, Tian Jin (CN); Jun Hu Liang, Tianjin (CN); Bo Zhang, Tianjin (CN)

(73) Assignee: INNOMOTICS GMBH, Nuremberg (DE)

( * ) Notice: Subject to any disclaimer, the term of this patent is extended or adjusted under 35 U.S.C. 154(b) by 0 days.

(21) Appl. No.: 18/041,974

(22) PCT Filed: Aug. 17, 2020

(86) PCT No.: PCT/CN2020/109590
§ 371 (c)(1),
(2) Date: Feb. 16, 2023

(87) PCT Pub. No.: WO2022/036519
PCT Pub. Date: Feb. 24, 2022

(65) Prior Publication Data
US 2023/0358305 A1 Nov. 9, 2023

(51) Int. Cl.
*F16H 57/021* (2012.01)
*F16H 57/02* (2012.01)
(Continued)

(52) U.S. Cl.
CPC ......... *F16H 57/021* (2013.01); *F16H 57/023* (2013.01); *F16H 57/029* (2013.01);
(Continued)

(58) Field of Classification Search
CPC .... F16H 57/021; F16H 57/023; F16H 57/029; F16H 57/0424; F16H 57/0454; F16H 2057/02013
(Continued)

(56) References Cited

U.S. PATENT DOCUMENTS 2,410,077 A * 10/1946 Keese ................... F16H 57/021
74/414
2,971,398 A * 2/1961 Sieving ................. F16H 57/037
475/198
(Continued)

FOREIGN PATENT DOCUMENTS

| CN | 202616917 U | 12/2012 | ............. F16C 35/04 |
| CN | 204 915 300 | 12/2015 | ............. H02K 17/28 |

(Continued)

OTHER PUBLICATIONS

Search Report for International Application No. PCT/CN2020/109590, 14 pages, Jun. 1, 2021.
(Continued)

*Primary Examiner* — Ha Dinh Ho
(74) *Attorney, Agent, or Firm* — Slayden Grubert Beard PLLC

(57) ABSTRACT

Various embodiments of the teachings herein include a gearbox adapter. For example, some embodiments include an adapter body with an internal cavity, a first end having a gearbox connection structure connecting the adapter body to a gearbox body, a first shaft hole in an end face of the first end providing communication between the internal cavity and an outside of the adapter body, and a second end having an opening in communication with the internal cavity; a transmission shaft configured to extend from the outside into the internal cavity via the opening and then out of the adapter body through the first shaft hole; an opening cover with a second shaft hole, the opening cover fitted at the second end to block the opening but allow the transmission shaft to pass out of the internal cavity through the second shaft hole; and a rotating bearing arranged in the internal cavity and fitted to the transmission shaft to support the transmission shaft.

16 Claims, 4 Drawing Sheets

(51) Int. Cl.
*F16H 57/023* (2012.01)
*F16H 57/029* (2012.01)
*F16H 57/04* (2010.01)

(52) U.S. Cl.
CPC ..... *F16H 57/0424* (2013.01); *F16H 57/0454* (2013.01); *F16H 2057/02013* (2013.01)

(58) Field of Classification Search
USPC ..................................... 74/606 R
See application file for complete search history.

(56) References Cited

U.S. PATENT DOCUMENTS 7,337,695 B2 * 3/2008 Muller .................. F16M 1/00
 74/606 R
8,015,898 B2 * 9/2011 Kitamura ............... F16H 57/04
 184/6.12

FOREIGN PATENT DOCUMENTS

| CN | 206 302 251 | 7/2017 | ............ H02K 5/173 |
| CN | 107 546 908 | 1/2018 | ............ H02K 5/24 |
| CN | 209 129 819 | 7/2019 | ............ F04B 39/02 |
| JP | H10127002 | 5/1998 | ............ H02K 5/15 |

OTHER PUBLICATIONS

Extended European Search Report, Application No. 20949732.0, 6 pages, Nov. 6, 2024.

\* cited by examiner

GEARBOX ADAPTER AND GEARBOX

CROSS-REFERENCE TO RELATED APPLICATIONS

This application is a U.S. National Stage Application of International Application No. PCT/CN2020/109590 filed Aug. 17, 2020, which designates the United States of America, the contents of which are hereby incorporated by reference in their entirety.

TECHNICAL FIELD

The present application relates to the field of gearbox design. Various embodiments of the teachings herein include gearbox adapters and/or gearboxs.

BACKGROUND

A gearbox adapter is installed on a gearbox body, and used to connect the gearbox body and a motor. In the prior art, the power of the motor is rated below 75 KW, but as the power of the motor increases, e.g. for the motor of 75 KW or 90 KW, the gearbox adapter structure in the prior art is no longer suitable for the connection requirements of the high-power motor mentioned above. This is because, due to structural limitations of the gearbox adapter in the prior art, the structural strength of the gearbox adapter is unable to withstand the rotation of the high-power motor.

Those skilled in the art are still working hard to find such a gearbox adapter for connection between the gearbox body and the motor with a power of 75 KW or more, to help solve the technical problem in the prior art that, due to structural limitations of the gearbox adapter, the structural strength requirements for high-power motor output cannot be met.

SUMMARY

The teachings of the present application include gearbox adapters and gearboxes which help solve the technical problem in the prior art that, due to structural limitations of the gearbox adapter, the structural strength requirements for high-power motor output cannot be met. For example, some embodiments include a gearbox adapter comprising: an adapter body (1), the adapter body (1) having an internal cavity (11), a first end (12) of the adapter body (1) having a gearbox connection structure (13) so that the adapter body (1) is connected to a gearbox body (2) via the gearbox connection structure (13), a first shaft hole (14) being provided in an end face of the first end (12) so that the internal cavity (11) is in communication with the outside of the adapter body (1) through the first shaft hole (14), and a second end (15) of the adapter body (1) having an opening (16) in communication with the internal cavity (11); a transmission shaft (3), the transmission shaft (3) being able to pass through the internal cavity (11) via the opening (16) and pass out of the adapter body (1) through the first shaft hole (14); an opening cover (4), the opening cover (4) having a second shaft hole (41), the opening cover (4) being fitted at the second end (15) to block the opening (16) and allow the transmission shaft (3) to pass out of the internal cavity (11) through the second shaft hole (41); and at least one bearing, arranged in the internal cavity (11) and fitted to the transmission shaft (3) to support the transmission shaft (3) and enable the transmission shaft (3) to rotate.

In some embodiments, the adapter body (1) has a first step (17) in the internal cavity (11), an end face of the first step (17) facing the opening (16); the at least one bearing comprises: a first bearing (5), an outer ring of the first bearing (5) being nested on an inner wall of the adapter body (1), an inner ring of the first bearing (5) being fitted round the transmission shaft (3), one end of the first bearing (5) abutting the first step (17), and the other end of the first bearing (5) being locked by means of a first locking ring (6) installed on the adapter body (1), to prevent the first bearing (5) from moving in the direction of the first locking ring (6).

In some embodiments, the internal cavity (11) between the first bearing (5) and the first shaft hole (14) forms a first oil chamber (111); and the adapter body (1) is provided with a first oil hole (18), so that the first oil chamber (111) communicates with the outside of the adapter body (1) through the first oil hole (18).

In some embodiments, a first sealing ring (7) is nested in the first shaft hole (14), to seal a gap between the first shaft hole (14) and the transmission shaft (3) by means of the first sealing ring (7); and the gearbox adapter further comprises an oil deflector ring (8), the oil deflector ring (8) being fitted round the transmission shaft (3), the oil deflector ring (8) abutting the end face of the first end (12), and being engaged in the first shaft hole (14).

In some embodiments, the transmission shaft (3) has a second step (31) and a third step (32), the second step (31) and the third step (32) being arranged in the internal cavity (11) between the first bearing (5) and the opening (16), an end face of the second step (31) facing the first bearing (5), the end face of the second step (31) abutting the inner ring of the first bearing (5), and an end face of the third step (32) facing the opening (16); and the at least one bearing further comprises a second bearing (9), an outer ring of the second bearing (9) being nested on the inner wall of the adapter body (1), an inner ring of the second bearing (9) being fitted round the transmission shaft (3), and one end of the second bearing (9) abutting the third step (32), and being locked by a second locking ring (10), to prevent the second bearing (9) from moving in the axial direction of the transmission shaft (3); a third bearing (1101), an outer ring of the third bearing (1101) being nested on the inner wall of the adapter body (1), an inner ring of the third bearing (1101) being fitted round the transmission shaft (3), one end of the third bearing (1101) abutting the other end of the second bearing (9), and the other end of the third bearing (1101) being locked by a third locking ring (1102), to prevent the third bearing (1101) from moving in the axial direction of the transmission shaft (3).

In some embodiments, a second oil chamber (112) is formed between the third bearing (1101) and the inner wall of the adapter body (1), and the opening cover (4); and the adapter body (1) is provided with a second oil hole (19), so that the second oil chamber (112) communicates with the outside of the adapter body (1) via the second oil hole (19).

In some embodiments, a second sealing ring (1103) is fitted between the second bearing (9) and the inner wall of the adapter body (1) by means of a first groove (110) on the inner wall of the adapter body (1).

In some embodiments, a third sealing ring (1104) is nested in the second shaft hole (41), to seal a gap between the second shaft hole (41) and the transmission shaft (3) by means of the third sealing ring (1104); and a fourth sealing ring (1105) is fitted between the opening cover (4) and the inner wall of the adapter body (1) by means of a second groove (1110) provided on the opening cover (4), to seal a gap between the opening cover (4) and the inner wall of the adapter body (1).

In some embodiments, a third groove (33) and a fourth groove (34) are provided on the transmission shaft (3) at one end of the first bearing (5) and the other end of the third bearing (1101); and the gearbox adapter further comprises: a fourth locking ring (1106), an inner ring of the fourth locking ring (1106) being engaged in the third groove (33), and an outer ring of the fourth locking ring (1106) abutting one end of the first bearing (5); and a fifth locking ring (1107), an inner ring of the fifth locking ring (1107) being engaged in the fourth groove (34), and an outer ring of the fifth locking ring (1107) abutting the other end of the third bearing (1101).

As another example, some embodiments include a gearbox comprising: a gearbox body (2); and one of the gearbox adapters as described herein, the gearbox adapter being connected to the gearbox body (2) via the gearbox connection structure (13); one end of the transmission shaft (3) protruding from the first shaft hole (14) is inserted into the gearbox body (2), and fitted to a high-speed gear (21) in the gearbox body (2).

BRIEF DESCRIPTION OF THE DRAWINGS

To explain the technical solution in embodiments of the present application or in the prior art more clearly, there follows a simple description of the accompanying drawings. Obviously, the drawings in the description below are merely some embodiments of the teachings of the present application, and a person skilled in the art could obtain other drawings based on these drawings without expending any inventive effort. In the figures.

Figure 1:
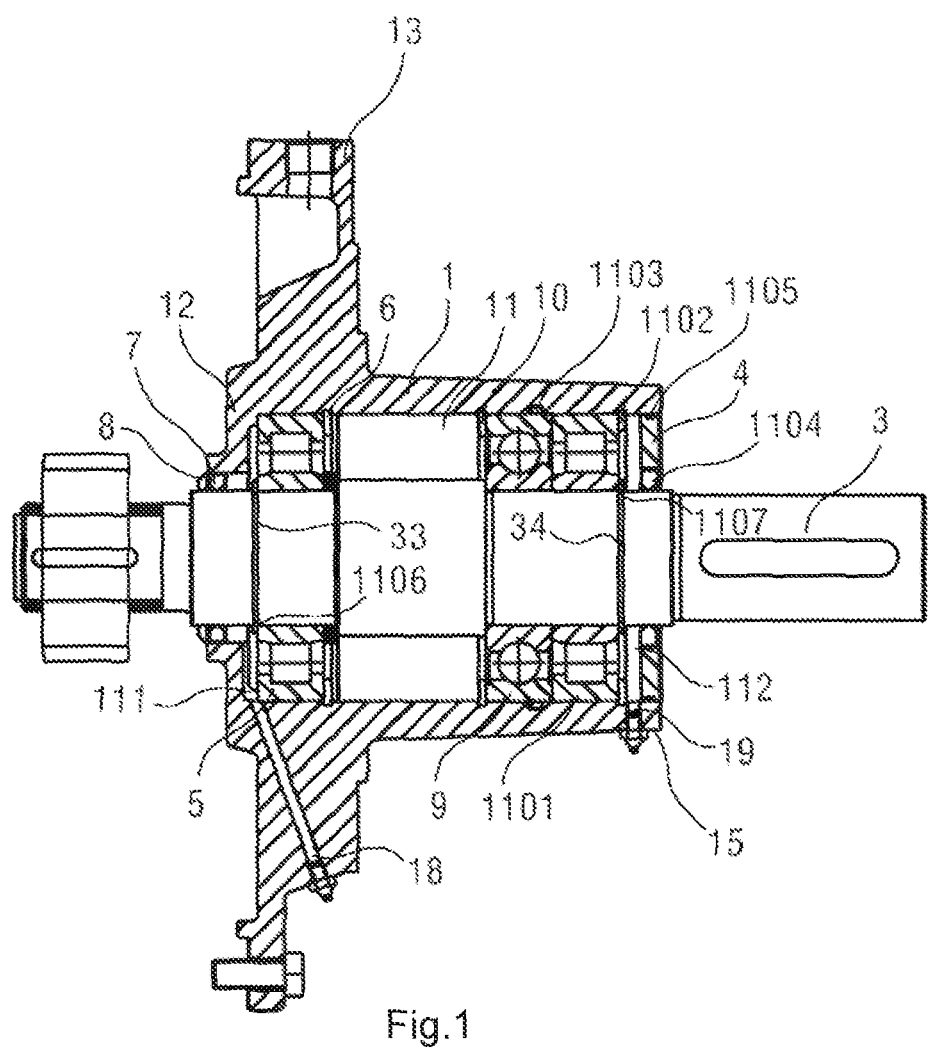
FIG. 1 is a schematic structural sectional view of a gearbox adapter incorporating teachings of the present application.

| Label | Meaning |
| --- | --- |
| 1 | adapter body |
| 11 | internal cavity |
| 111 | first oil chamber |
| 112 | second oil chamber |
| 12 | first end |
| 13 | gearbox connection structure |
| 14 | first shaft hole |
| 15 | second end |
| 16 | opening |
| 17 | first step |
| 18 | first oil hole |
| 19 | second oil hole |
| 110 | first groove |
| 1110 | second groove |
| 2 | gearbox body |
| 21 | high-speed gear |
| 3 | transmission shaft |
| 31 | second step |
| 32 | third step |
| 33 | third groove |
| 34 | fourth groove |
| 4 | opening cover |
| 41 | second shaft hole |
| 5 | first bearing |
| 6 | first locking ring |

-continued

| Label | Meaning |
| --- | --- |
| 7 | first sealing ring |
| 8 | oil deflector |
| 9 | second bearing |
| 10 | second locking ring |
| 1101 | third bearing |
| 1102 | third locking ring |
| 1103 | second sealing ring |
| 1104 | third sealing ring |
| 1105 | fourth sealing ring |
| 1106 | fourth locking ring |
| 1107 | fifth locking ring |

DETAILED DESCRIPTION

In some embodiments, a gearbox adapter includes an adapter body, a transmission shaft, an opening cover and at least one bearing; the adapter body having an internal cavity, a first end of the adapter body having a gearbox connection structure so that the adapter body is connected to a gearbox body via the gearbox connection structure, a first shaft hole being provided in an end face of the first end so that the internal cavity is in communication with the outside of the adapter body through the first shaft hole, and a second end of the adapter body having an opening in communication with the internal cavity; and the transmission shaft being able to pass through the internal cavity via the opening and pass out of the adapter body through the first shaft hole; the opening cover having a second shaft hole, the opening cover being fitted at the second end to block the opening and allow the transmission shaft to pass out of the internal cavity through the second shaft hole; and the at least one bearing being arranged in the internal cavity and fitted to the transmission shaft to support the transmission shaft and enable the transmission shaft to rotate. The adapter body 1 is an integral structure, which can meet the structural strength requirements of a high-power motor such as a 75 KW power motor, thus helping to solve the technical problem in the prior art that, due to structural limitations of the gearbox adapter, the structural strength requirements for high-power motor output cannot be met.

In some embodiments, the adapter body has a first step in the internal cavity, an end face of the first step facing the opening; the at least one bearing comprises a first bearing; an outer ring of the first bearing being nested on an inner wall of the adapter body, an inner ring of the first bearing being fitted round the transmission shaft, one end of the first bearing abutting the first step, and the other end of the first bearing being locked by means of a first locking ring, to prevent the first bearing from moving in the axial direction of the transmission shaft. A specific structure of the gearbox adapter has only one said first bearing.

In some embodiments, a first oil chamber is formed between the first bearing and the first shaft hole; the adapter body is provided with a first oil hole, so that the first oil chamber communicates with the outside of the adapter body through the first oil hole. A structure of the gearbox adapter allows lubricating the first bearing.

In some embodiments, a first sealing ring is nested in the first shaft hole, to seal a gap between the first shaft hole and the transmission shaft by means of the first sealing ring; the gearbox adapter further comprises an oil deflector ring; the oil deflector ring being fitted round the transmission shaft, the oil deflector ring abutting the end face of the first end, and being engaged in the first shaft hole. A specific structure allows sealing the first oil chamber.

In some embodiments, the transmission shaft has a second step and a third step, the second step and the third step being arranged in the internal cavity between the first bearing and the opening, an end face of the second step facing the first bearing, the end face of the second step abutting the inner ring of the first bearing, and an end face of the third step facing the opening; the at least one bearing further comprises a second bearing and a third bearing; an outer ring of the second bearing being nested on the inner wall of the adapter body, an inner ring of the second bearing being fitted round the transmission shaft, and one end of the second bearing abutting the third step, and being locked by a second locking ring, to prevent the second bearing from moving in the axial direction of the transmission shaft; an outer ring of the third bearing being nested on the inner wall of the adapter body, an inner ring of the third bearing being fitted round the transmission shaft, one end of the third bearing abutting the other end of the second bearing, and the other end of the third bearing being locked by a third locking ring, to prevent the third bearing from moving in the axial direction of the transmission shaft. A particular manner of implementation has three bearings to support the transmission shaft.

In some embodiments, a second oil chamber is formed between the third bearing and the inner wall of the adapter body, and the opening cover; the adapter body is provided with a second oil hole, so that the second oil chamber communicates with the outside of the adapter body via the second oil hole. This provides a particular manner of implementation for sealing the second oil chamber.

In some embodiments, a second sealing ring is fitted between the second bearing and the inner wall of the adapter body by means of a first groove on the inner wall of the adapter body. This provides a manner of establishing a seal between the second bearing and the inner wall of the adapter body is provided.

In some embodiments, a third sealing ring is nested in the second shaft hole, to seal a gap between the second shaft hole and the transmission shaft by means of the third sealing ring; a fourth sealing ring is fitted between the opening cover and the inner wall of the adapter body by means of a second groove provided on the opening cover, to seal a gap between the opening cover and the inner wall of the adapter body. This provides a particular manner of establishing a seal between the second shaft hole and the transmission shaft is provided.

In some embodiments, a third groove and a fourth groove are provided on the transmission shaft at one end of the first bearing and the other end of the third bearing; the gearbox adapter further comprises a fourth locking ring and a fifth locking ring; an inner ring of the fourth locking ring being engaged in the third groove, and an outer ring of the fourth locking ring abutting one end of the first bearing; an inner ring of the fifth locking ring being engaged in the fourth groove, and an outer ring of the fifth locking ring abutting the other end of the third bearing. This provides a particular manner of implementation for preventing axial shifting of the transmission shaft by means of the fourth locking ring and the fifth locking ring.

In some embodiments, there is a gearbox, comprising a gearbox body and the gearbox adapter; the gearbox adapter being connected to the gearbox body via the gearbox connection structure; one end of the transmission shaft protruding from the first shaft hole is inserted into the gearbox body, and fitted to a high-speed gear in the gearbox body. This provides a specific structure of the gearbox having the gearbox adapter.

The technical solutions of the present application are described below with reference to the drawings showing example embodiments of the teachings herein. Obviously, the embodiments described are merely some, not all, of the embodiments of those teachings. All other embodiments obtained by those of ordinary skill in the art based on the embodiments in the present application without creative effort shall fall within the protection scope of the present application.

The external support structure of a gearbox adapter in the prior art is composed of multiple parts connected by flanges. However, the above-mentioned structure is not only troublesome to install, but more importantly, when the gearbox adapter in the prior art is connected to a motor with a power of 75 KW or higher, the strength of the split structure thereof struggles to withstand the high power output of the motor. Therefore, those skilled in the art are looking for a new structure for the gearbox adapter, so that the gearbox adapter can be connected to a motor with a high power of 75 KW or more.

FIG. 1 is a schematic structural sectional view of a gearbox adapter incorporating teachings of the present application. As shown in FIG. 1, the gearbox adapter comprises an adapter body 1, a transmission shaft 3 and at least one bearing; the transmission shaft 3 runs through the adapter body 1, and the at least one bearing is disposed in an internal cavity 11 of the adapter body 1 to support the transmission shaft 3, such that the transmission shaft 3 is able to rotate. One end of the adapter body 1 is provided with a gearbox connection structure 13 for connecting to a gearbox body 2; a flange structure may be used for the gearbox connection structure 13. In this embodiment, the adapter body 1 is in one piece and integrally formed, unlike the split structure in the prior art. This enables the gearbox adapter to be connected to the motor with a high power such as 75 KW, helping to solve the technical problem in the prior art that, due to structural limitations of the gearbox adapter, the structural strength requirements for high-power motor output cannot be met.

Figure 2:
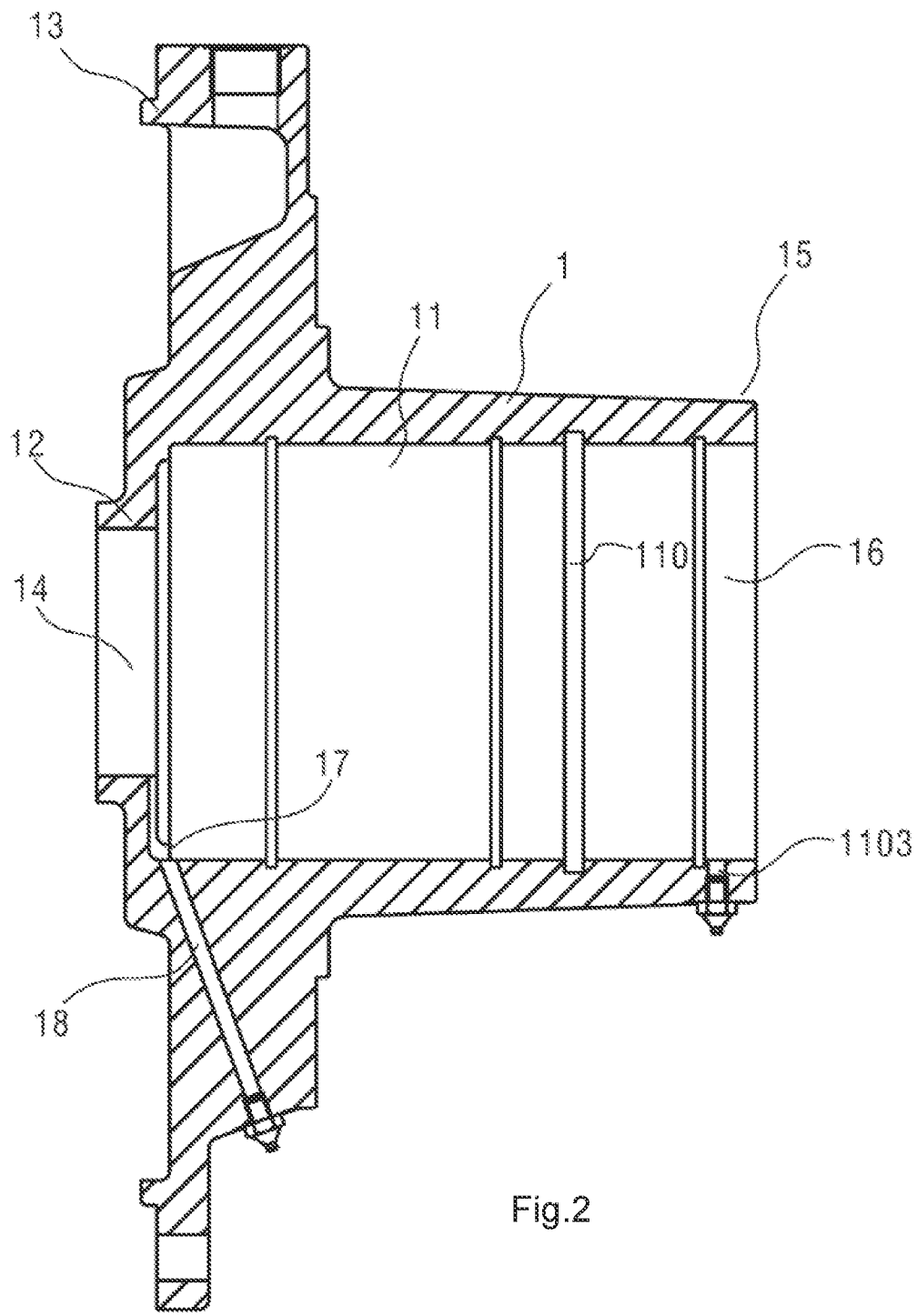
FIG. 2 is a schematic structural diagram of an adapter body incorporating teachings of the present application.

FIG. 2 is a schematic structural diagram of an adapter body incorporating teachings of the present application. As shown in FIG. 2, the gearbox adapter includes an adapter body 1 and a transmission shaft 3, an opening cover 4 and at least one bearing.

The adapter body 1 has an internal cavity 11; a first end 12 of the adapter body 1 has a gearbox connection structure 13 so that the adapter body 1 is connected to a gearbox body 2 via the gearbox connection structure 13; a first shaft hole 14 is provided in an end face of the first end 12 so that the internal cavity 11 communicates with the outside of the adapter body 1 through the first shaft hole 14; and a second end 15 of the adapter body 1 has an opening 16 communicating with the internal cavity 11.

The transmission shaft 3 can pass through the internal cavity 11 via the opening 16 and pass out of the adapter body 1 through the first shaft hole 14.

The opening cover 4 has a second shaft hole 41, and the opening cover 4 is fitted to the second end 15 to block the opening 16 and allow the transmission shaft 3 to pass through the second shaft hole 41 and out of the internal cavity 11.

The at least one bearing is arranged in the internal cavity 11 and fitted to the transmission shaft 3 to support the transmission shaft 3 and enable the transmission shaft 3 to rotate.

In this embodiment, the adapter body 1 is an integrally formed structure. The gearbox connection structure 13 may be connected to the gearbox body 2 using a flange structure; the adapter body 1 has an internal cavity 11, and to enable better fitting of the bearing, the internal cavity 11 may be a tubular cavity, so that an outer ring of the bearing can be nested in the adapter boy 1, with the inner ring of the bearing then being fitted round the transmission shaft 3. The transmission shaft 3 also passes through the adapter body 11 via the internal cavity 11, so the first shaft hole 14 is also provided in the end face of the first end 12, to allow the transmission shaft 3 to pass through for connection. The second end 15 at the opposite end from the first end 12 is an opening 16 communicating with the internal cavity 11. The function of the opening 16 is to allow the bearing to be fitted into the internal cavity 1, but a gap between the opening 16 and the transmission shaft 3 is too large, so the opening cover 4 is used to block the opening 16. The opening cover 4 may be fitted to the second end 15 by a tolerance fit, i.e. an interference fit. The second shaft hole 41 is provided in the opening cover 4, so that the transmission shaft 3 passes out of the adapter body 1 through the second shaft hole 41. In the above structure, the adapter body 1 is an integral structure, so can be connected to the high-power motor, e.g. the motor with a power specification of 75 KW or more, to realize the connection between the motor and the gearbox body 2, and ensure that the structural strength of the adapter body 1 is sufficient for the connection of the high-power motor, thus helping to solve the technical problem in the prior art that, due to structural limitations of the gearbox adapter, the structural strength requirements for high-power motor output cannot be met.

In some embodiments, the adapter body 1 has a first step 17 in the internal cavity 11, and an end face of the first step 17 faces the opening 16. The at least one bearing comprises a first bearing 5.

The outer ring of the first bearing 5 is nested on an inner wall of the adapter body 1, the inner ring of the first bearing 5 is fitted round the transmission shaft 3, one end of the first bearing 5 abuts the first step 17, and the other end of the first bearing 5 is locked by means of a first locking ring 6 installed on the adapter body 1, to prevent the first bearing 5 from moving in the direction of the first locking ring 6.

In this embodiment, the first step 17 and the first locking ring 6 lock the first bearing 5, to prevent the first bearing 5 from moving bidirectionally in the axial direction of the transmission shaft 3. The installation of the first locking ring 6 may be accomplished by providing a locking groove on the adapter body 1; the configuration of the locking groove is a conventional design of those skilled in the art, and will not be repeated here.

In some embodiments, the internal cavity 11 between the first bearing 5 and the first shaft hole 14 forms a first oil chamber 111. The adapter body 1 is provided with a first oil hole 18, so that the first oil chamber 111 communicates with the outside of the adapter body 1 through the first oil hole 18.

In this embodiment, the user can inject lubricating grease into the first oil chamber 111 through the first oil hole 18; moreover, the structure of the internal cavity 11 and the first bearing 5 themselves may be used to form the first oil chamber 111; in addition, the first oil hole 18 may be blocked by a first grease nipple.

In some embodiments, a first sealing ring 7 is nested in the first shaft hole 14, to seal a gap between the first shaft hole 14 and the transmission shaft 3 by means of the first sealing ring 7. The gearbox adapter further comprises an oil deflector ring 8. The oil deflector ring 8 is fitted round the transmission shaft 3; the oil deflector ring 8 abuts the end face of the first end 12, and is engaged in the first shaft hole 14. In this embodiment, a sealing structure of the first oil chamber 111 prevents the lubricating grease in the first oil chamber 111 from flowing out of the adapter body 1.

Figure 3:
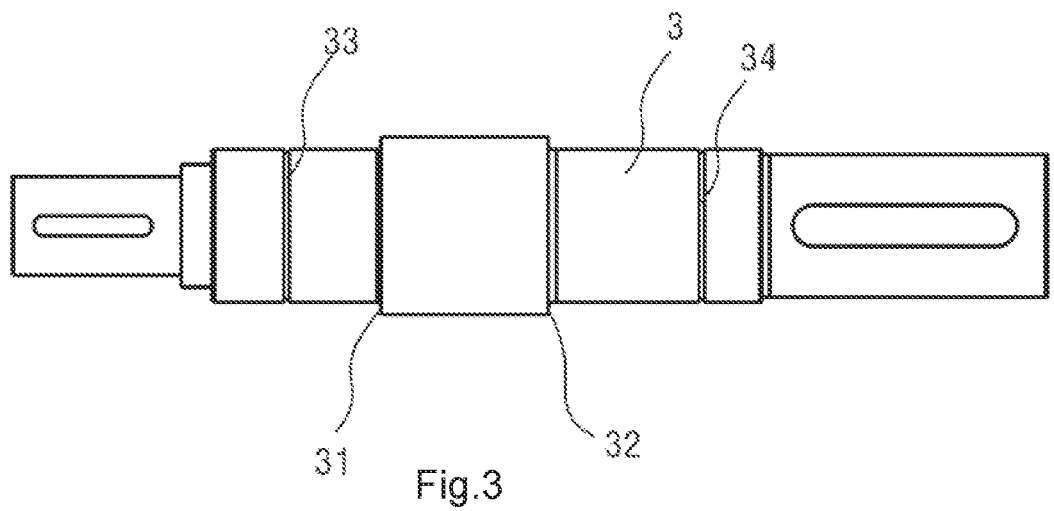
FIG. 3 is a schematic structural diagram of a transmission shaft incorporating teachings of the present application.

FIG. 3 is a schematic structural diagram of a transmission shaft incorporating teachings of the present application. As shown in FIG. 3, the transmission shaft 3 has a second step 31 and a third step 32, the second step 31 and the third step 32 being arranged in the internal cavity 11 between the first bearing 5 and the opening 16; an end face of the second step 31 faces the first bearing 5, and the end face of the second step 31 abuts the inner ring of the first bearing 51, while an end face of the third step 32 faces the opening.

The at least one bearing further comprises a second bearing 9 and a third bearing 1101. The outer ring of the second bearing 9 is nested on the inner wall of the adapter body 1, the inner ring of the second bearing 9 is fitted round the transmission shaft 3, and one end of the second bearing 9 abuts the third step 32, and is locked by a second locking ring 10, to prevent the second bearing 9 from moving in the axial direction of the transmission shaft 3.

The outer ring of the third bearing 1101 is nested on the inner wall of the adapter body 1, the inner ring of the third bearing 1101 is fitted round the transmission shaft 3, one end of the third bearing 1101 abuts the other end of the second bearing 9, and the other end of the third bearing 1101 is locked by a third locking ring 1102, to prevent the third bearing 1101 from moving in the axial direction of the transmission shaft 3.

In this embodiment, the second bearing 9 and third bearing 1101 are also provided, the first bearing 5 providing support at one support point of the transmission shaft 3, and the second bearing 9 and third bearing 1101 correspondingly supporting another support point of the transmission shaft 3 jointly. In the prior art, if the method of supporting two support points is adopted, the two support points will be respectively provided on two parts of the split gearbox adapter. This will make assembly of the two parts of the split gearbox adapter very difficult, because the coaxiality of the two parts must be precisely adjusted. For the high-power motor, the diameter of the transmission shaft 3 will inevitably increase, and if the design of the prior art is still used, the overall size of the split gearbox adapter will also increase accordingly, and as the overall size increases, the coaxiality becomes more and more difficult to guarantee. Thus, in the structure of this embodiment, due to the fact that the adapter body 1 is still a one-piece structure, it will have a higher coaxiality than the split gearbox adapter, because the processing of the internal cavity 11 is completed in a single clamped machining operation, whereas coaxiality is ensured through manual assembly in the prior art. In addition, a specific structure for preventing movement of the second bearing and third bearing in the axial direction of the transmission shaft 3 is also disclosed in this embodiment: the second locking ring 10 and the third locking ring 1102. The abutment of the second step 31 and the third step 32 against the first bearing 5 and the second bearing 9 respectively will also prevent the transmission shaft 3 from shifting in the axial direction.

In some embodiments, a second oil chamber 112 is formed between the third bearing 1101 and the opening cover 4. The adapter body 1 is provided with a second oil hole 19, so that the second oil chamber 112 communicates with the outside of the adapter body 1 via the second oil hole 19.

In this embodiment, a specific structure lubricates the third bearing 1101 by means of the second oil chamber 112. The second oil chamber 112 is formed by the third bearing 1101, the inner wall of the adapter body 1 and the opening cover 4, and the user can inject lubricating grease into the second oil chamber 112 through the second oil hole 19. In addition, the second oil hole 19 can be blocked by means of a second grease nipple.

In some embodiments, a second sealing ring 1103 is fitted between the second bearing 9 and the inner wall of the adapter body 1 by means of a first groove 110 on the inner wall of the adapter body 1.

Figure 4:
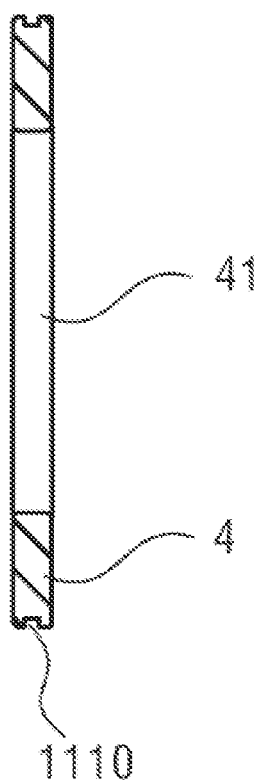
FIG. 4 is a schematic structural diagram of an opening cover incorporating teachings of the present application.

FIG. 4 is a schematic structural diagram of the opening cover incorporating teachings of the present application. As shown in FIG. 4, a sealing structure between the second bearing 9 and the inner wall of the adapter body 1 is provided in this embodiment.

In some embodiments, a third sealing ring 1104 is nested in the second shaft hole 41, to seal a gap between the second shaft hole 41 and the transmission shaft 3 by means of the third sealing ring 1104.

A fourth sealing ring 1105 is fitted between the opening cover 4 and the inner wall of the adapter body 1 by means of a second groove 1110 provided on the opening cover 4, to seal a gap between the opening cover 4 and the inner wall of the adapter body 1.

In some embodiments, a specific manner of establishing a seal between the second shaft hole 41 and the transmission shaft 3, and between the opening cover 4 and the adapter body 1, prevents foreign matter from entering the internal cavity 11 of the adapter body 1.

In some embodiments, a third groove 33 and a fourth groove 34 are provided on the transmission shaft 3 at one end of the first bearing 5 and the other end of the third bearing 1101.

The gearbox adapter further comprises a fourth locking ring 1106 and a fifth locking ring 1107.

An inner ring of the fourth locking ring 1106 is engaged in the third groove 33, and an outer ring of the fourth locking ring 1106 abuts one end of the first bearing 5.

An inner ring of the fifth locking ring 1107 is engaged in the fourth groove 34, and an outer ring of the fifth locking ring 1107 abuts the other end of the third bearing 1101.

In this embodiment, a specific structure locks the transmission shaft 3 by means of the fourth locking ring 1106 and the fifth locking ring 1107. Axial shifting of the transmission shaft is prevented by means of the fourth locking ring 1106 and the fifth locking ring 1107.

Figure 5:
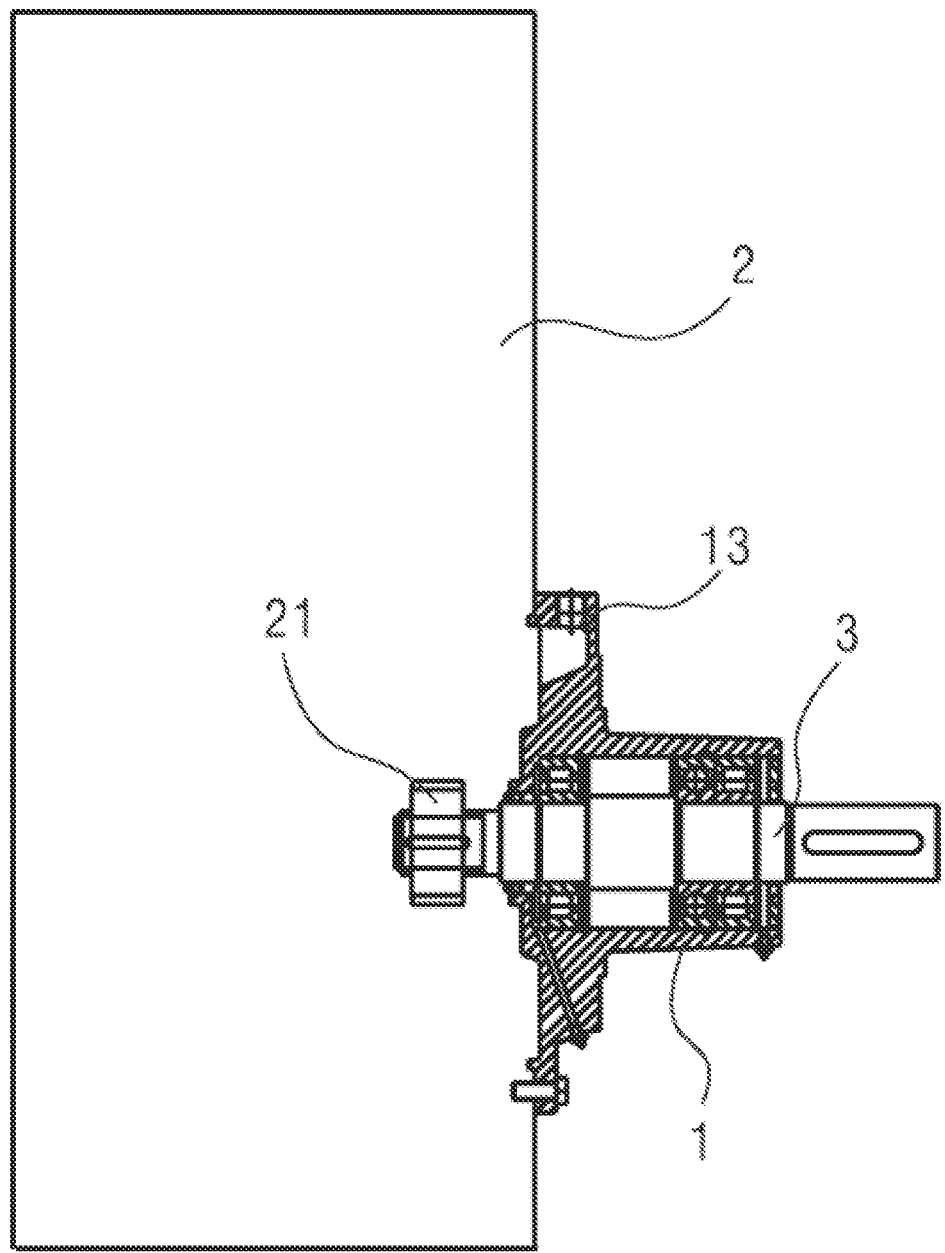
FIG. 5 is a schematic structural diagram of a gearbox incorporating teachings of the present application.

FIG. 5 is a schematic structural diagram of a gearbox incorporating teachings of the present application. As shown in FIG. 5, in one embodiment, the present application provides a gearbox, comprising a gearbox body 2 and the gearbox adapter.

The gearbox adapter is connected to the gearbox body 2 via the gearbox connection structure 13; one end of the transmission shaft 3 protruding from the first shaft hole 14 is inserted into the gearbox body 2, and fitted to a high-speed gear 21 in the gearbox body 2.

What is claimed is:

1. A gearbox adapter comprising:
an adapter body with an internal cavity, a first end having a gearbox connection structure connecting the adapter body to a gearbox body, a first shaft hole in an end face of the first end providing communication between the internal cavity and an outside of the adapter body, and a second end having an opening in communication with the internal cavity;
a transmission shaft configured to extend from the outside into the internal cavity via the opening and then out of the adapter body through the first shaft hole;
an opening cover with a second shaft hole, the opening cover fitted at the second end to block the opening but allow the transmission shaft to pass out of the internal cavity through the second shaft hole;
a rotating bearing arranged in the internal cavity and fitted to the transmission shaft to support the transmission shaft;
a first step in the internal cavity with an end face of the first step facing the opening;
wherein the rotating bearing comprises a first bearing with an outer ring nested on an inner wall of the adapter body and an inner ring fitted round the transmission shaft;
a first end of the first bearing abuts the first step; and
a second end of the first bearing is locked by a first locking ring installed on the adapter body to prevent the first bearing from moving in the direction of the first locking ring.

2. The gearbox adapter as claimed in claim 1, wherein:
the internal cavity between the first bearing and the first shaft hole defines a first oil chamber; and
the adapter body includes a first oil hole providing communication between the first oil chamber and the outside of the adapter body.

3. The gearbox adapter as claimed in claim 2, further comprising:
a first sealing ring nested in the first shaft hole to seal a gap between the first shaft hole and the transmission shaft; and
an oil deflector ring fitted round the transmission shaft abutting the end face, and engaged in the first shaft hole.

4. The gearbox adapter as claimed in claim 1, wherein:
the transmission shaft has a second step and a third step arranged in the internal cavity between the first bearing and the opening;
an end face of the second step faces the first bearing and abuts the inner ring of the first bearing; and
an end face of the third step faces the opening; and
the rotating bearing includes:
a second bearing with an outer ring nested on the inner wall of the adapter body and an inner ring fitted round the transmission shaft, wherein a first end of the second bearing abuts the third step, and the second bearing is locked by a second locking ring to prevent the second bearing from moving in the axial direction of the transmission shaft; and
a third bearing with an outer ring nested on the inner wall of the adapter body and an inner ring fitted round the transmission shaft, with a first end abutting a second end of the second bearing and a second end of the third bearing locked by a third locking ring to prevent the third bearing from moving in the axial direction of the transmission shaft.

5. The gearbox adapter as claimed in claim 4, wherein a second oil chamber is defined between the third bearing and the inner wall of the adapter body and the opening cover; the adapter body includes a second oil hole providing communication between the second oil chamber and the outside of the adapter body.

6. The gearbox adapter as claimed in claim 4, further comprising a second sealing ring fitted between the second bearing and the inner wall of the adapter body using a first groove on the inner wall of the adapter body.

7. The gearbox adapter as claimed in claim 4, further comprising:
a third sealing ring nested in the second shaft hole to seal a gap between the second shaft hole and the transmission shaft; and
a fourth sealing ring fitted between the opening cover and the inner wall of the adapter body using a second groove in the opening cover to seal a gap between the opening cover and the inner wall of the adapter body.

8. The gearbox adapter as claimed in claim 4, further comprising:
a third groove and a fourth groove on the transmission shaft at the first end of the first bearing and the second end of the third bearing;
a fourth locking ring with an inner ring engaged in the third groove and an outer ring abutting the first end of the first bearing;
a fifth locking ring with an inner ring engaged in the fourth groove and an outer ring abutting the second end of the third bearing.

9. The gearbox as claimed in claim 1, wherein:
the transmission shaft has a second step and a third step arranged in the internal cavity between the first bearing and the opening;
an end face of the second step faces the first bearing and abuts the inner ring of the first bearing; and
an end face of the third step faces the opening; and
the rotating bearing includes:
a second bearing with an outer ring nested on the inner wall of the adapter body and an inner ring fitted round the transmission shaft, wherein a first end of the second bearing abuts the third step, and the second bearing is locked by a second locking ring to prevent the second bearing from moving in the axial direction of the transmission shaft; and
a third bearing with an outer ring nested on the inner wall of the adapter body and an inner ring fitted round the transmission shaft, with a first end abutting a second end of the second bearing and a second end of the third bearing locked by a third locking ring to prevent the third bearing from moving in the axial direction of the transmission shaft.

10. The gearbox as claimed in claim 9, wherein a second oil chamber is defined between the third bearing and the inner wall of the adapter body and the opening cover;
the adapter body includes a second oil hole providing communication between the second oil chamber and the outside of the adapter body.

11. The gearbox as claimed in claim 9, further comprising a second sealing ring fitted between the second bearing and the inner wall of the adapter body using a first groove on the inner wall of the adapter body.

12. The gearbox as claimed in claim 9, further comprising:
a third sealing ring nested in the second shaft hole to seal a gap between the second shaft hole and the transmission shaft; and
a fourth sealing ring fitted between the opening cover and the inner wall of the adapter body using a second groove in the opening cover to seal a gap between the opening cover and the inner wall of the adapter body.

13. The gearbox as claimed in claim 9, further comprising:
a third groove and a fourth groove on the transmission shaft at the first end of the first bearing and the second end of the third bearing;
a fourth locking ring with an inner ring engaged in the third groove and an outer ring abutting the first end of the first bearing;
a fifth locking ring with an inner ring engaged in the fourth groove and an outer ring abutting the second end of the third bearing.

14. A gearbox comprising:
a gearbox body; and
an adapter body with an internal cavity, a first end having a gearbox connection structure connecting the adapter body to a gearbox body, a first shaft hole in an end face of the first end providing communication between the internal cavity and an outside of the adapter body, and a second end having an opening in communication with the internal cavity;
a transmission shaft configured to extend from the outside into the internal cavity via the opening and then out of the adapter body through the first shaft hole;
an opening cover with a second shaft hole, the opening cover fitted at the second end to block the opening but allow the transmission shaft to pass out of the internal cavity through the second shaft hole; and
a rotating bearing arranged in the internal cavity and fitted to the transmission shaft to support the transmission shaft;
wherein the adapter body is connected to the gearbox body via the gearbox connection structure;
one end of the transmission shaft protruding from the first shaft hole is inserted into the gearbox body and fitted to a high-speed gear in the gearbox body;
a first step in the internal cavity with an end face of the first step facing the opening;
wherein the rotating bearing comprises a first bearing with an outer ring nested on an inner wall of the adapter body and an inner ring fitted round the transmission shaft;
a first end of the first bearing abuts the first step; and
a second end of the first bearing is locked by a first locking ring installed on the adapter body to prevent the first bearing from moving in the direction of the first locking ring.

15. The gearbox as claimed in claim 14, wherein:
the internal cavity between the first bearing and the first shaft hole defines a first oil chamber; and
the adapter body includes a first oil hole providing communication between the first oil chamber and the outside of the adapter body.

16. The gearbox as claimed in claim 15, further comprising:
a first sealing ring nested in the first shaft hole to seal a gap between the first shaft hole and the transmission shaft; and
an oil deflector ring fitted round the transmission shaft abutting the end face, and engaged in the first shaft hole.

* * * * *